(12) United States Patent
Abramov et al.

(10) Patent No.: US 8,035,901 B2
(45) Date of Patent: Oct. 11, 2011

(54) LASER SCORING WITH CURVED TRAJECTORY

(75) Inventors: Anatoli Anatolyevich Abramov, Painted Post, NY (US); Yawei Sun, Horseheads, NY (US); Qi Wu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 412 days.

(21) Appl. No.: 12/324,541

(22) Filed: Nov. 26, 2008

(65) Prior Publication Data
US 2009/0272149 A1   Nov. 5, 2009

Related U.S. Application Data

(60) Provisional application No. 61/125,956, filed on Apr. 30, 2008.

(51) Int. Cl.
*G02B 13/18* (2006.01)
*G02B 3/02* (2006.01)
*B23K 26/00* (2006.01)

(52) U.S. Cl. .................... 359/719; 359/709; 219/121.69

(58) Field of Classification Search .................. 359/709, 359/719, 210.1, 210.2; 65/112; 255/96; 219/121.69
See application file for complete search history.

(56) References Cited

U.S. PATENT DOCUMENTS

| | | | |
|---|---|---|---|
| 5,475,197 A * | 12/1995 | Wrobel et al. | 219/121.69 |
| 5,609,284 A | 3/1997 | Kondratenko | 225/1 |
| 5,776,220 A | 7/1998 | Allaire et al. | 65/112 |
| 6,660,963 B2 * | 12/2003 | Hoekstra et al. | 219/121.72 |

FOREIGN PATENT DOCUMENTS

| | | |
|---|---|---|
| JP | 10-085975 | 4/1998 |
| KR | 10-2007-0018761 | 2/2007 |
| WO | WO91-04829 | 4/1991 |

OTHER PUBLICATIONS

Dickey, et al "Gaussain laser beam profile shaping", Opt. Eng. 35 (11) 3285-3295 Nov. 1996.

* cited by examiner

*Primary Examiner* — Alicia M Harrington
(74) *Attorney, Agent, or Firm* — Bruce P. Watson

(57) ABSTRACT

Disclosed are systems and methods for scoring and separating a glass sheet along a curved trajectory using a laser and optics. The system includes a laser that generates a laser beam, a focusing lens, and a conical optical component, such as a conical lens or a reflective conical mirror. The laser directs the laser beam through the focusing lens and conical lens to create a curved score line that is projected onto a glass sheet to create a curved score line, along which the glass sheet can be separated. Optionally, the laser directs the laser beam through the focusing lens towards a conical mirror, off of which the laser beam is reflected toward the glass sheet to create a curved score line.

16 Claims, 4 Drawing Sheets

LASER SCORING WITH CURVED TRAJECTORY

PRIORITY

This application claims priority to U.S. Patent Application No. 61/125,956, filed Apr. 30, 2008, titled "Laser Scoring With Curved Trajectory".

TECHNICAL FIELD

The present invention relates to systems and methods for scoring and separating glass sheets along a curved trajectory. More specifically, systems and methods are provided for using a laser and optics to generate a curved laser beam profile and project it onto a glass sheet, which creates a curved score line on the glass sheet along which the glass sheet can be scored and separated.

BACKGROUND

In the past, several different methods and techniques have been used to cut glass sheets. The most widely used method is mechanical scoring using a wheel made of a hard material and breaking the glass along the score line. The mechanical scribing and breaking process generates debris that collects on the glass surface and requires thorough cleaning. Therefore, glass technology areas that require high glass quality, such as the LCD industry, cannot reliably use mechanical scribing techniques to form glass sheets.

Other widely used methods include the use of lasers to score and/or separate glass sheets. In one technique, a laser beam is used to score the glass; the glass is then separated by mechanical separation techniques. When the laser beam is moved across the glass sheet, it creates a temperature gradient on the surface of the glass sheet, which is enhanced by a coolant (such as a gas or liquid) that follows the laser beam at some distance. Specifically the heating of the glass sheet by the laser and the rapid cooling of the glass sheet by the coolant creates tensile stresses in the glass sheet. The tensile stresses create a crack (or score vent) in the glass surface. In this manner, a score line is created along the glass sheet. The glass sheet can then be separated into two smaller sheets by separating the glass sheet along the score line. Yet another technique uses a first laser beam to score the glass. A second laser beam of a different configuration is used to accomplish laser separation.

Conventional techniques generally employ an elongated laser beam to provide enhanced scoring speed. Due to the elongation of the laser beam that is needed to achieve higher scoring speeds, these techniques are limited to linear scoring trajectories.

Thus, there is a need in the art for systems and methods to cut glass sheets along curved trajectories.

SUMMARY

Systems and methods are provided for scoring and separating glass sheets along a curved trajectory. More specifically, methods are provided for separating a glass sheet comprising providing a focusing lens and positioning the focusing lens in a plane that is substantially parallel to the glass sheet. The method can further comprise providing a conical lens and positioning the conical lens between the focusing lens and the glass sheet. A laser beam can be generated and directed through the focusing lens and the conical lens to generate a resultant curved laser beam profile on the glass sheet, which creates a curved score line on the glass sheet. According to a further aspect, the method can comprise separating the glass sheet along the curved score line.

Systems are also provided for separating a glass sheet along a line that is at least partially curved. An exemplary system, in one aspect, can comprise a laser configured to produce a laser beam, a focusing lens, and a conical lens. The focusing lens can be positioned between the laser and the glass sheet in a plane that is substantially parallel to the glass sheet. The conical lens, which can have a planar base surface and an opposing conical surface defining an apex, can be positioned between the focusing lens and the glass sheet. In one aspect, the conical lens is positioned with its planar base surface opposing the focusing lens and the apex opposing the glass sheet. The laser can direct the laser beam through the focusing lens and the conical lens to generate a resultant curved laser beam profile. The curved laser beam profile can be projected on the glass sheet to create a curved score line on the glass sheet.

According to yet another aspect, an exemplary system is provided that comprises a laser configured to produce a laser beam, a focusing lens, and a reflective conical mirror. The focusing lens can be positioned between the laser and the reflective conical mirror. The laser can be configured to direct the laser beam through the focusing lens toward the reflective conical mirror such that the laser beam is reflected from the conical mirror toward the glass sheet to create a curved score line on the glass sheet.

Additional aspects of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed and/or as claimed.

BRIEF DESCRIPTION OF THE DRAWINGS

The accompanying drawings, which are incorporated in and constitute a part of this specification illustrate various aspects of the invention and, together with the description, serve to explain the principles of the invention.

DETAILED DESCRIPTION

Figure 1:
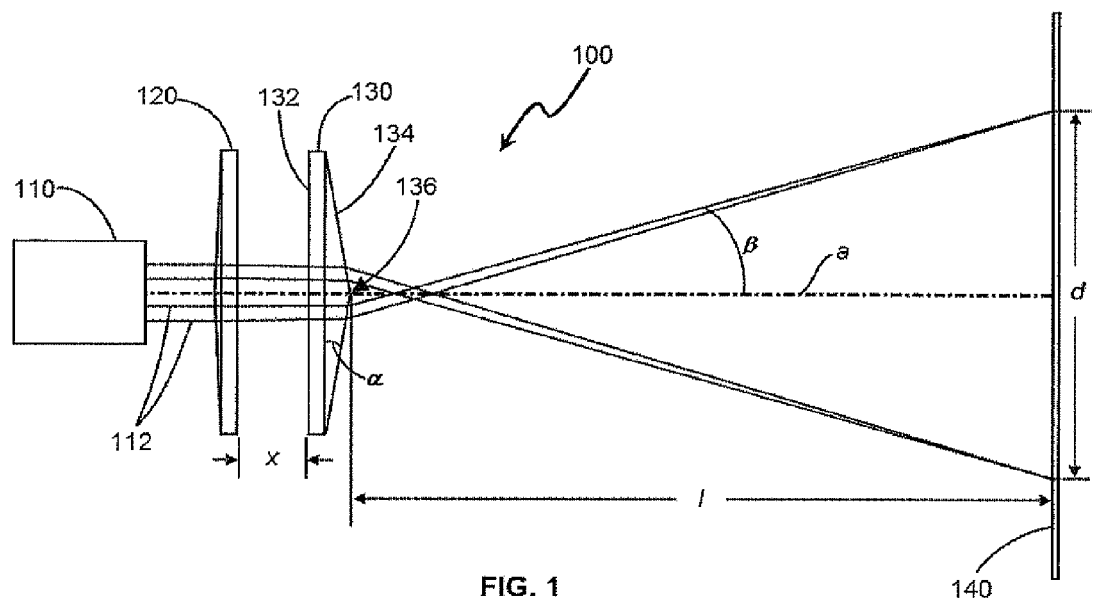
FIG. 1 illustrates an exemplary system for scoring and separating glass sheets along a curved trajectory using a conical lens.

The following description of the invention is provided as an enabling teaching of the invention in its best, currently known embodiment. To this end, those skilled in the relevant art will recognize and appreciate that many changes can be made to the various embodiments described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "and" and "the" include plural referents unless the context clearly dictates otherwise. Thus, for example, reference to a "laser beam" includes embodiments having two or more such laser beams unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As briefly summarized above, systems and methods are provided for scoring and separating glass sheets along a curved trajectory. The system 100, in one aspect, comprises a laser 110, a focusing lens 120, and a conical lens 130. The laser is configured to produce one or more laser beams 112. In one aspect, the laser is a $CO_2$ laser. Optionally, a fiber laser, an Nd:YAG laser, or other laser can be used. Thus, it is contemplated that various lasers can be used to score and separate the glass sheets and aspects of the present invention are not intended to be limited to any specific laser or any specific laser wavelength. Similarly, the laser beam produced by the laser can have any of various mode profiles including Gaussian mode, D mode, flat top mode, etc.

As shown in FIG. 1, the focusing lens 120 can be positioned between the laser 110 and the glass sheet 140 in a plane that is substantially parallel to the glass sheet. The focusing lens, in one aspect, is a ZnSe focusing lens. As can be seen in FIG. 1, according to various aspects, the conical lens 130 has a planar base surface 132 and a conical surface 134 with a central apex 136. The conical lens can be positioned between the focusing lens and the glass sheet with the planar base surface 132 opposing the focusing lens 120 and the conical surface 134 opposing the glass sheet 140. According to various aspects, the conical lens is spaced from the glass sheet at a predetermined distance l that is selected to produce a resultant curved laser beam profile 150 with a predetermined radius of curvature, as discussed further herein below. The conical lens 130 in one aspect is an Axicon. A typical conical lens 130 has an index of refraction ("n") and a geometric angle of the conical surface 134, represented by $\alpha$ in FIG. 1. The cone angle $\beta$ of the generated annular laser beam profile on the glass can be determined by the equation:

$$n \sin(\alpha) = \sin(\alpha + \beta)$$

The diameter d of the resultant annular laser beam profile can be determined by the distance l between the conical lens and the glass sheet 140. In one aspect, the diameter can be determined by the equation:

$$d = 2/\tan(\beta).$$

Figure 2:
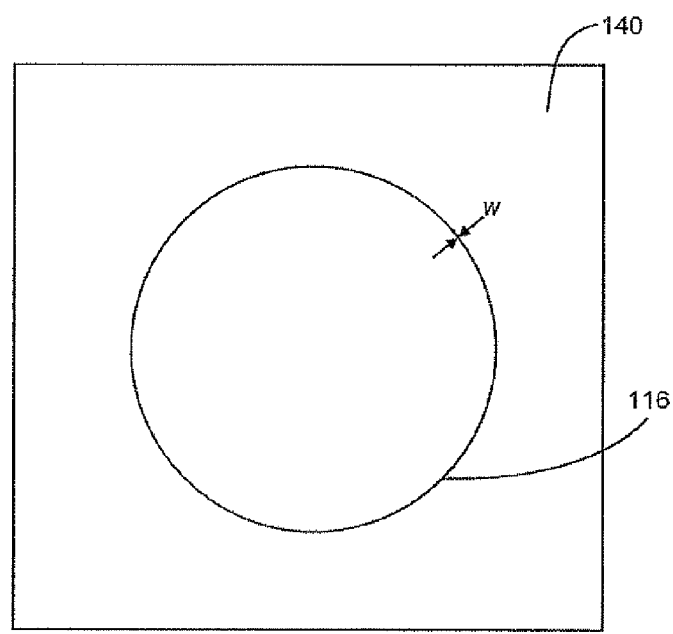
FIG. 2 illustrates an exemplary annular beam scoring line created on a glass sheet by the system of FIG. 1.

The laser 110 is configured to direct the laser beam 112 through the focusing lens 120 and the conical lens 130 to generate a resultant curved laser beam profile 150. The curved laser beam profile is projected on the glass sheet 140 to create a curved score line 116 on the glass sheet, as shown in FIG. 2. The width w of the curved score line can be selected by the varying any one of the diameter of the input laser beam 112, the focal length of the focusing lens, and the working distance x between the focusing lens and the conical lens, or by varying any combination thereof. In one aspect, the width of the curved score line can be determined by the equation:

$$w = \frac{\lambda f}{\pi W}$$

where $\lambda$ is the wavelength of the laser beam, f is the focal length of the focusing lens, and W is the radius of the input laser beam.

In one aspect the laser 110, focusing lens 120, and conical lens 130 are coaxially aligned along a common axis a. As illustrated in FIG. 1, the laser can be configured to direct the laser beam(s) 112 along the common axis to produce a resultant curved laser beam profile 150 that is substantially annular. As shown in FIG. 2, the substantially annular laser beam profile creates a substantially annular score line 116 on the glass sheet 140.

Figure 3:
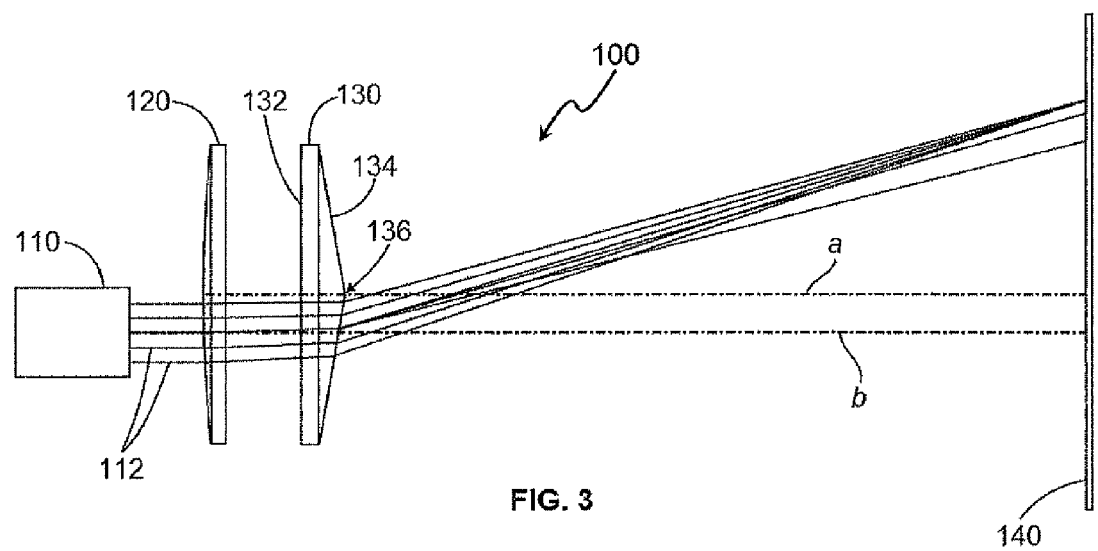
FIG. 3 illustrates an alternative exemplary system for scoring and separating glass sheets along a curved trajectory using a conical lens.
Figure 4:
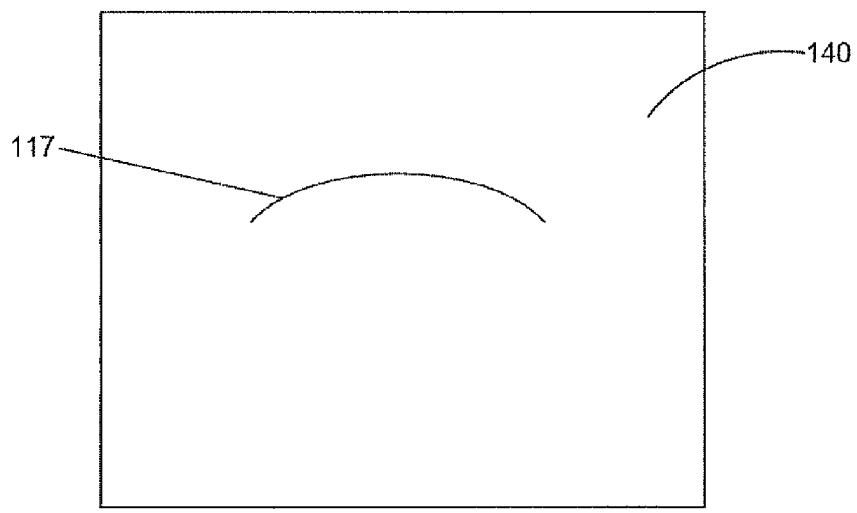
FIG. 4 illustrates an exemplary arcuate scoring line created on a glass sheet by the system of FIG. 3.

Optionally, as shown in FIG. 3, the laser 110 can be configured to direct the laser beam(s) 112 along an axis b that is parallel to and separated from the common axis a of the focusing lens and conical lens in order to produce a resultant curved laser beam profile that is substantially arcuate. Alternatively, the conical lens can be axially offset from the focusing lens, and the laser beam can be projected along the axis of the focusing lens to generate a resultant curved laser beam profile that is substantially arcuate. As shown in FIG. 4, the substantially arcuate laser beam profile creates a substantially arcuate score line 117 on the glass sheet 140. The length of the arcuate score line can be selected by the varying the amount of offset between the laser beam 112 and the common axis a, or the offset ($\Delta$) between the laser beam and the conical lens axis (not shown). The radius of curvature of the arcuate score line can be determined using the equation described above for determining the diameter of the annular laser beam profile, where the diameter is equal to twice the radius of curvature. The length $\eta$ of the arcuate score line can be determined by the equation;

$$\eta = \frac{W}{\Delta} 2r$$

where W is the radius of the input laser beam, and r is the calculated radius of curvature of the arcuate score line.

In another aspect, the conical lens can be tilted relative to the focusing lens (not shown) such that the planar base surface 132 of the conical lens is at an angle relative to the plane of the focusing lens 120. The resultant curved laser beam profile is substantially elliptical and creates a substantially elliptical score line on the glass sheet. In a further aspect, if the laser beam is offset from the focusing lens and conical lens, the resultant curved laser beam profile will be a segment or a portion of an ellipse. Optionally, the conical lens can be positioned with its planar base surface 132 substantially parallel to the plane of the focusing lens. The glass sheet can be tilted to a selected position such that it lies in a plane that is angled relative to the plane of the focusing lens. In this manner, the resultant curved laser beam profile on the glass sheet is substantially elliptical and generates a substantially elliptical score line.

Figure 5:
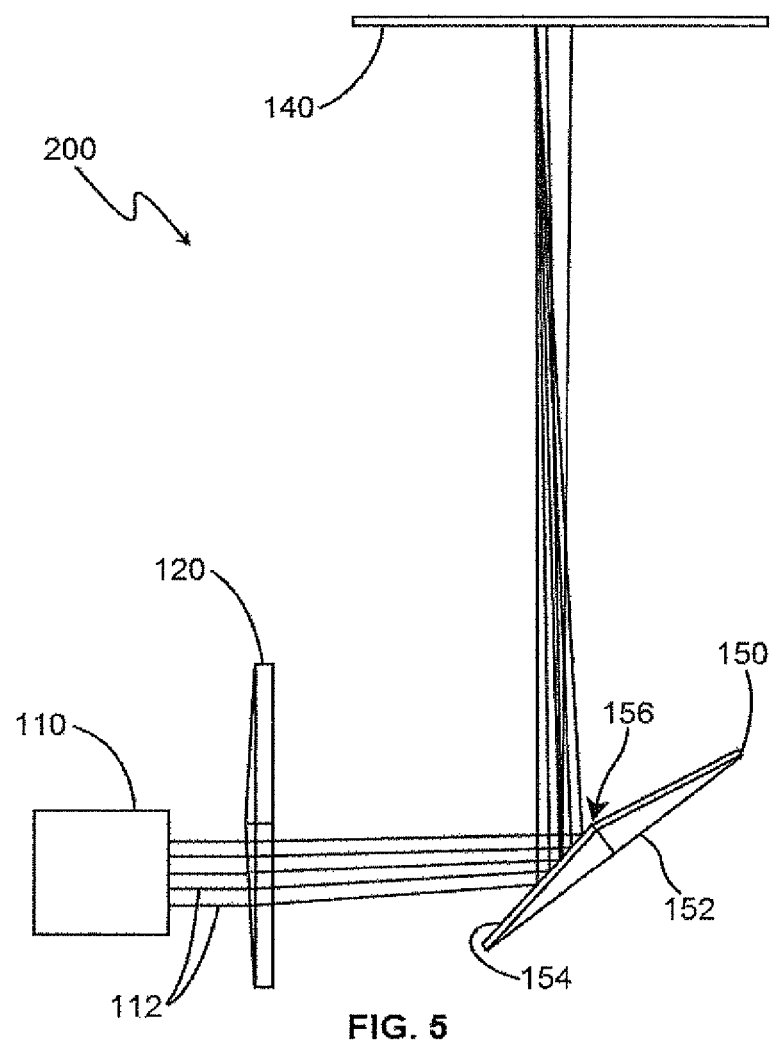
FIG. 5 illustrates an alternative exemplary system for scoring and separating glass sheets along a curved trajectory using a conical mirror.
Figure 6:
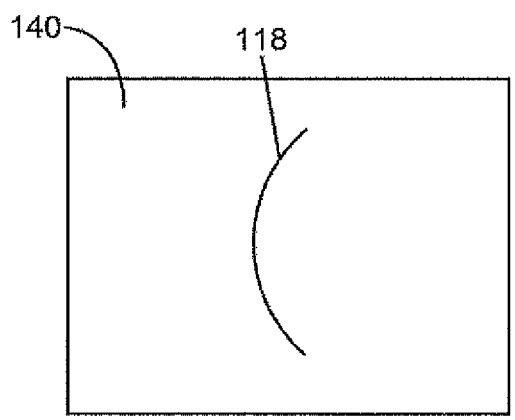
FIG. 6 illustrates an exemplary arcuate scoring line created on a glass sheet by the system of FIG. 5

According to yet another aspect, a system 200 is provided that comprises a laser 110, a focusing lens 120 and a reflective conical mirror 150, as illustrated in FIG. 5. The conical mirror can have a planar base portion 152 and a conical surface 154 with a central apex 156. At least a portion of the conical surface is reflective. The conical mirror is positioned so that at least a portion of the reflective surface opposes the focusing lens. As shown in FIG. 5, the conical lens 120 is positioned between the laser 110 and the conical mirror 150. The laser is configured to produce one or more laser beams 112 and direct the laser beam(s) through the focusing lens toward the conical mirror such that the laser beam(s) is reflected from the reflective conical mirror toward the glass sheet to create a curved score line 118 on the glass sheet 140, as shown in FIG. 6.

Figure 7:
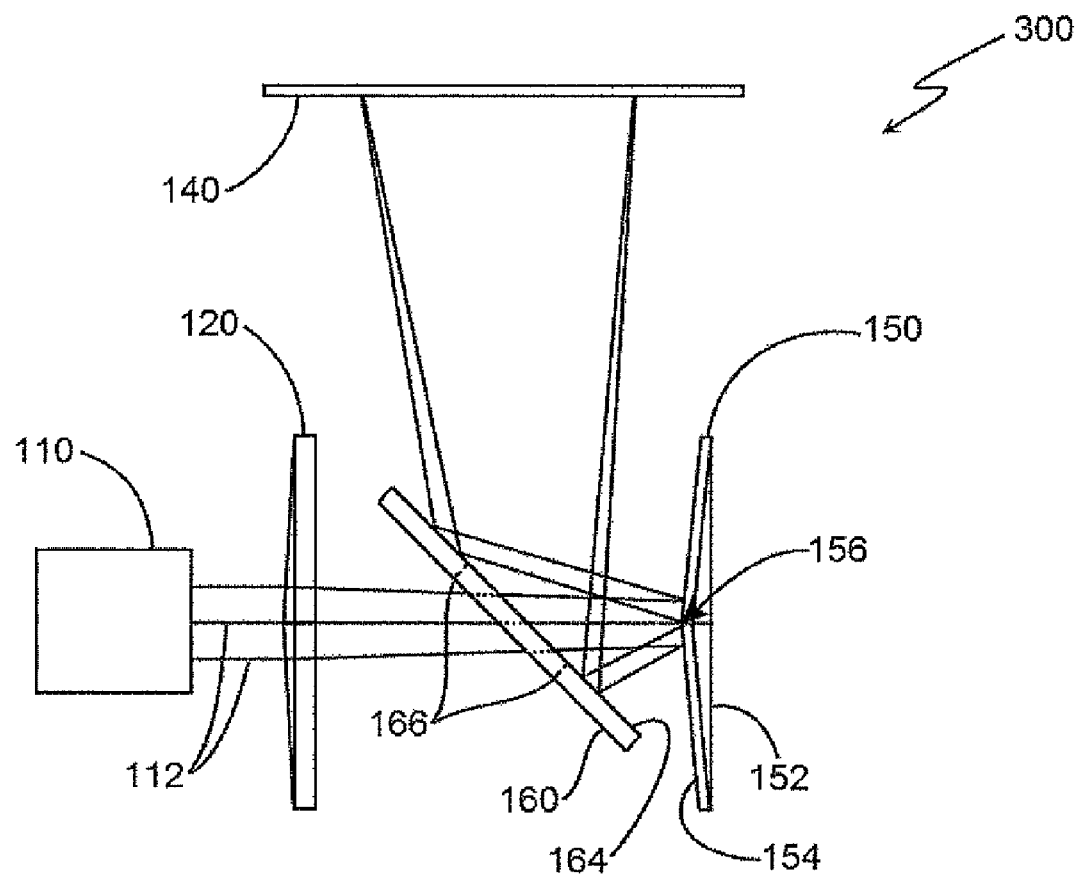
FIG. 7 illustrates an alternative exemplary system for scoring and separating glass sheets along a curved trajectory using a conical mirror.

According to yet another aspect, a system 300 is provided that comprises a laser 110, a focusing lens 120, a reflective conical mirror 150, and an annular planar mirror 160 with a through-hole 166, such as shown in FIG. 7. Such an exemplary system can be used, for example, to create an annular score line on the glass sheet. For example, the laser, focusing lens, and conical mirror can be coaxially aligned. The planar mirror 160 can be positioned between the focusing lens and the conical mirror with the reflective surface 164 opposing the conical surface 154 of the conical mirror. The planar mirror 160 can be substantially planar and can be positioned at an angle relative to the planar base surface 152 of the conical mirror. As shown in FIG. 7, the laser is configured to produce one or more laser beams 112 and direct the laser beam(s) through the focusing lens 120, through the through-hole 166 of the planar mirror 160, toward the conical mirror 154. The beams are reflected off of the reflective conical surface 154 of the conical mirror, toward the reflective surface 164 of the planar mirror. The beams are then reflected toward the glass sheet 140 to create an annular score line on the glass sheet (not shown). As shown in FIG. 7, the through-hole of the planar mirror can have a predetermined diameter that is large enough to allow the laser beam(s) to be projected from the laser beam to the conical mirror, but small enough to allow substantially all of the laser beams reflected from the conical mirror to strike the reflective surface of the planar mirror and be reflected therefrom toward the glass sheet. The through-hole, in a further aspect, is defined substantially centrally with respect to the planar mirror. However, it is contemplated that the position and size of the through-hole can be altered as desired and are not intended to be limited.

According to various aspects, exemplary systems can further comprise a mechanical device to which the conical lens or conical mirror can be mounted. The mechanical device can be configured to translate the conical lens or conical mirror into different positions relative to the laser beam or out of the laser beam path. Thus, flexible scoring trajectories can be achieved.

In use, methods are provided for scoring and separating glass sheets using exemplary systems as described herein. In one aspect, a focusing lens is provided and is positioned in a plane that is substantially parallel to the glass sheet, such as shown in FIGS. 1 and 3. A conical lens is provided having a planar base surface and an opposing conical surface. The conical lens is positioned between the focusing lens and the glass sheet with the planar base surface opposing the focusing lens and the conical surface opposing the glass sheet. A laser beam is generated and is directed through the focusing lens and the conical lens to generate a resultant curved laser beam profile on the glass sheet. The curved laser beam profile creates a curved score line on the glass sheet.

In one aspect, the conical lens and focusing lens can be positioned coaxially along a common axis. The laser beam(s) can be directed along the common axis to produce a resultant curved laser beam profile that is substantially annular. In one aspect, a plurality of laser beams can be directed along axes that are parallel to and radially spaced from the common axis to generate a resultant annular laser beam profile. Optionally, a single, substantially circular laser beam having a predetermined diameter can be directed along the common axis to generate the resultant annular laser beam profile. In yet another aspect, the laser beam(s) can be directed along an axis (or a plurality of axes) that is parallel to and separated from the common axis to produce a curved laser beam profile that is substantially arcuate.

According to various aspects, the conical lens is positioned at a predetermined distance from the glass sheet; the predetermined distance can be selected to produce a resultant curved laser beam profile having a predetermined radius of curvature. For example, as shown in FIGS. 1 and 2, the conical lens can be coaxially aligned with the focusing lens and the laser beam(s) such that an annular scoring line having a predetermined diameter is created on the glass sheet. If the conical lens is moved closer to the glass sheet, the diameter of the annular score line will be reduced; similarly, if the conical lens is moved away from the glass sheet, the diameter of the annular score line will be increased. Similar results can be achieved in the system illustrated in FIGS. 3 and 4, which is configured to produce an arcuate score line having a predetermined radius of curvature.

In yet another aspect, the conical lens can be positioned by tilting it relative to the focusing lens such that the planar base surface of the conical lens is at an angle relative to the plane of the focusing lens. The laser beam is directed through the focusing lens and conical lens and generates a resultant curved laser beam profile that is substantially elliptical. In a further aspect, the laser can be offset from the axis of the tilted conical lens in order to generate an arcuate laser beam profile that forms a segment of an ellipse. The curvature of the ellipse (or elliptical segment) can be varied by adjusting the tilt-angle of the conical lens relative to the focusing lens.

According to yet another aspect, a conical mirror such as described herein above can be provided in place of the conical lens, such as shown in FIG. 5. The laser and focusing lens can be offset from each other axially, and the conical mirror can be positioned at an angle relative to the plane of the focusing lens. The laser can be configured to generate laser beam(s) and direct them through the focusing lens to the conical mirror. The beam(s) can be reflected from the reflective conical surface of the mirror toward the glass sheet to produce an arcuate laser beam profile. Thus, an arcuate score line is created on the glass sheet.

Optionally, the conical mirror can be positioned so that its planar base surface is substantially parallel to the plane of the focusing lens, with the reflective surface of the conical mirror opposing the focusing lens, such as shown in FIG. 7. A planar mirror defining a center through-hole can be positioned between the focusing lens and conical mirror, with the reflective surface of the planar mirror opposing the conical mirror. The planar mirror can be positioned at an angle relative to the planar base surface of the conical mirror so that beams reflected from the conical mirror can be reflected off of the planar mirror and away from the conical mirror. According to a particular aspect, the glass sheet can be positioned substantially perpendicular to the plane of the focusing lens. In this aspect, it is contemplated that the planar mirror can be positioned at an angle of approximately 45° relative to the plane of the focusing lens to direct the laser beam(s) toward the glass sheet. However, it is contemplated that the glass sheet and the planar mirror can be positioned at a variety of angles independently of each other and aspects described herein are not intended to be limited to the angles described above. The laser is configured to generate a laser beam(s) and direct the laser beam(s) through the focusing lens, through the through-hole of the planar mirror, toward the reflective conical surface of the conical mirror. The laser beam(s) is then reflected from the conical mirror toward the reflective surface of the planar mirror, and reflected toward the glass sheet to generate an annular laser beam profile. Thus, an annular score line is created on the glass sheet.

According to various aspects, the glass sheet is separated along the curved score line generated by the laser beam. Thus, as shown in FIG. 2, for example, after the annular score line is created, the glass sheet can be separated along the score line to create an annular piece of glass sheet. It is contemplated that, after the score line is created, the glass sheet can be mechanically separated. Optionally, the laser can project the laser beams on the glass two or more times to fully separate the glass sheet along the curved score line.

Lastly, it should be understood that while the present invention has been described in detail with respect to certain illustrative and specific embodiments thereof, it should not be considered limited to such, as numerous modifications are possible without departing from the broad spirit and scope of the present invention as defined in the appended claims.

The invention claimed is:

1. A method for separating a glass sheet, comprising:
providing a focusing lens and positioning the focusing lens in a plane that is substantially parallel to the glass sheet;
providing a conical lens having a planar base surface and an opposing conical surface defining a central apex;
positioning the conical lens between the focusing lens and the glass sheet with the planar base surface opposing the focusing lens and the apex opposing the glass sheet;
generating a laser beam;
directing the laser beam through the focusing lens and the conical lens to generate a resultant curved laser beam profile on the glass sheet, wherein the curved laser beam profile creates a curved score line on the glass sheet; and
separating the glass sheet along the curved score line.

2. The method of claim 1, wherein positioning the conical lens comprises positioning the focusing lens and the conical lens coaxially along a common axis, and wherein directing the laser beam comprises directing the laser beam along the common axis, wherein the resultant curved laser beam profile is substantially annular.

3. The method of claim 1, wherein positioning the conical lens comprises positioning the focusing lens and the conical lens coaxially along a common axis, and wherein directing the laser beam comprises directing the laser beam along an axis that is parallel to and separated from the common axis, wherein the resultant curved laser beam profile is substantially arcuate.

4. The method of claim 1, wherein positioning the conical lens comprises tilting the conical lens relative to the focusing lens such that the planar base surface of the conical lens is at an angle relative to the plane of the focusing lens, wherein the resultant curved laser beam profile is substantially elliptical.

5. The method of claim 1, wherein positioning the conical lens comprises positioning the conical lens at a predetermined distance from the glass sheet, wherein the predetermined distance is selected to produce the resultant curved laser beam profile with a predetermined radius of curvature.

6. A system for separating a glass sheet along a line that is at least partially curved, comprising:
a laser configured to produce a laser beam;
a focusing lens positioned between the laser and the glass sheet, wherein the focusing lens is positioned in a plane that is substantially parallel to the glass sheet;
a conical lens having a planar base surface and an opposing conical surface defining a central apex, wherein the conical lens positioned between the focusing lens and the glass sheet with the planar base surface opposing the focusing lens and the apex opposing the glass sheet,
wherein the laser is configured to direct the laser beam through the focusing lens and the conical lens to generate a resultant curved laser beam profile and project the curved laser beam profile on the glass sheet to create a curved score line on the glass sheet.

7. The system of claim 6, wherein the laser, the focusing lens and the conical lens are coaxially aligned along a common axis and the laser is configured to direct the laser beam along the common axis, and wherein the resultant curved laser beam profile is substantially annular.

8. The system of claim 6, wherein the focusing lens and the conical lens are coaxially aligned along a common axis and the laser is configured to direct the laser beam along an axis that is parallel to and separated from the common axis, and wherein the resultant curved laser beam profile is substantially arcuate.

9. The system of claim 6, wherein the conical lens is tilted relative to the focusing lens such that the planar base surface of the conical lens is at an angle relative to the plane of the focusing lens, and wherein the resultant curved laser beam profile is substantially elliptical.

10. The system of claim 6, wherein the conical lens is positioned at a predetermined distance from the glass sheet, wherein the predetermined distance is selected to produce the resultant curved laser beam profile with a predetermined radius of curvature.

11. The system of claim 6, wherein the focusing lens is a ZnSe focusing lens.

12. The system of claim 6, wherein the laser is a $CO_2$ laser.

13. A system for separating a glass sheet along a line that is at least partially curved, comprising:
a laser configured to produce a laser beam;
a focusing lens;
a reflective conical mirror;
wherein the focusing lens is positioned between the laser and the reflective conical mirror, and wherein the laser is configured to direct the laser beam through the focusing lens toward the reflective conical mirror such that the laser beam is reflected from the reflective conical mirror toward the glass sheet to create a curved score line on the glass sheet.

14. The system of claim 13, wherein the focusing lens is positioned in a plane that is substantially perpendicular to the glass sheet.

15. The system of claim 13, wherein the focusing lens is a ZnSe focusing lens.

16. The system of claim 13, wherein the laser is a $CO_2$ laser.

* * * * *